(12) United States Patent
Nishino et al.

(10) Patent No.: US 7,797,926 B2
(45) Date of Patent: Sep. 21, 2010

(54) APPARATUS FOR DETECTING A STATE OF A PARTICULATE FILTER

(75) Inventors: Hiroaki Nishino, Saitama (JP); Kiyoshi Saito, Saitama (JP); Eisaku Gosyo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 697 days.

(21) Appl. No.: 11/790,694

(22) Filed: Apr. 26, 2007

(65) Prior Publication Data
US 2007/0251214 A1 Nov. 1, 2007

(30) Foreign Application Priority Data
Apr. 27, 2006 (JP) ............... 2006-123168

(51) Int. Cl.
*F02B 27/04* (2006.01)
*F01N 3/00* (2006.01)
*F01N 3/02* (2006.01)

(52) U.S. Cl. ............... 60/277; 60/273; 60/297; 60/311

(58) Field of Classification Search .......... 60/277, 60/285, 296, 297, 273, 311
See application file for complete search history.

(56) References Cited

U.S. PATENT DOCUMENTS

| 6,085,518 A | * | 7/2000 | Yamashita et al. | ............ 60/276 |
| 6,497,095 B2 | * | 12/2002 | Carberry et al. | ............ 60/295 |
| 2005/0268597 A1 | * | 12/2005 | Kosaka | ............ 60/277 |
| 2007/0056271 A1 | * | 3/2007 | Berryhill et al. | ............ 60/297 |

FOREIGN PATENT DOCUMENTS

| JP | 57-159519 A | 10/1982 |
| JP | 08-284644 A | 10/1996 |

\* cited by examiner

*Primary Examiner*—Thomas E Denion
*Assistant Examiner*—Audrey Klasterka
(74) *Attorney, Agent, or Firm*—Arent Fox LLP

(57) ABSTRACT

A particulate filter is provided in an exhaust system of the engine. Parameter values correlated with a flow amount of exhaust gas of the engine are determined, and differential pressure between upstream and downstream sides of the particulate filter is determined. The ratio of a variation rate of the parameter values correlated with the exhaust flow amount to a variation rate of the differential pressure is compared with a predetermined threshold value during transitional operation of the engine to determine the state of the particulate filter.

21 Claims, 8 Drawing Sheets

(a) DPF NORMAL $\gamma = \alpha / \beta$

Time (b) DPF FAILURE $\gamma = \alpha / \beta$

Time

US 7,797,926 B2

APPARATUS FOR DETECTING A STATE OF A PARTICULATE FILTER

BACKGROUND OF THE INVENTION

The present invention relates to an apparatus for detecting a state of a particulate filter for trapping particle matters in exhaust gas of an internal-combustion engine.

In general, an engine, in particular, a diesel engine exhausts particle matters (herein after referred to as "PM") at its operation time. In order to prevent the PM from exhausting to the atmosphere, a particulate filter is provided in an exhaust system of the diesel engine. The particulate filter traps the PM when the exhaust gas passes through small holes in a wall of the filter toward adjacent passage.

Sometimes, the particulate filter may not be able to trap the PM due to some damage in the filter. In order to detect such a failure state, it is preferable that the state of the particulate filter be always estimated from sensor information.

The Japanese Patent Application Publication No. S57-159519 discloses a technique for determining clogging in the particulate filter by detecting a difference between pressures in upstream and downstream sides of the particulate filter and an exhaust flow amount. Determination of clogging is made based on the ratio of the two values.

Japanese Patent Application Publication No. H8-284644 discloses a technique for calculating an amount of PM accumulated in a particulate filter based on the difference between pressures in upstream and downstream sides of the particulate filter and a flow volume of exhaust gas. Based on the accumulated PM amount, time for starting a regeneration process on the particulate filter is determined. Also, failure of the particulate filter is determined based on change in time of the accumulated PM amount.

Characteristics of the state of the particulate filter appear clearly during transitional operation such as acceleration and deceleration. It is an objective of the present invention to provide a scheme for determining a state of a particulate filter during transitional operation of an engine.

SUMMARY OF THE INVENTION

The present invention provides an apparatus for detecting a state of the particulate filter of an internal-combustion engine. The particulate filter is provided in an exhaust system of the engine. The apparatus includes means for detecting values of a parameter correlated with the flow amount of exhaust gas of the engine. The apparatus also includes a differential pressure detecting means for detecting the differential pressure between upstream and downstream sides of the particulate filter. The apparatus further include a means for determining failure of the particulate filter by comparing with a predetermined threshold value during transitional operation of the engine the ratio of a variation rate of the parameter correlated with the exhaust flow amount and a variation rate of the differential pressure.

According to the invention, the state of the particulate filter can be accurately determined during transitional operation of the engine when characteristics of the state of the particulate filter clearly appear.

According to one aspect of the present invention, the parameter having a correlation with the exhaust flow amount is an internal pressure of an air intake pipe of the engine.

According to another aspect of the present invention, the ratio of the variation rate of the parameter correlated with the exhaust flow amount to the variation rate of the differential pressure is compared with a first threshold value to determine a failure of the particulate filter. Further, the ratio of the variation rate of the parameter correlated with the exhaust flow amount to the variation rate of the differential pressure is compared with a second threshold value to determine over-accumulation of particulates in the particulate filter.

According to a further aspect of the present invention, the first threshold value is established in accordance with an accumulation amount of the particulates in the particulate filter and the second threshold value is established in accordance with an amount of residue ashes in the particulate filter. According to this invention, the state of the particulate filter can be accurately determined taking into consideration of influences of the amount of the accumulated PM and the amount of the residue ashes.

According to a yet further aspect of the present invention, the state determining means integrates differences between a current value and a previous value of the ratio of the variation rate of the parameter correlated with the exhaust flow amount to the variation rate of the differential pressure. The particulate filter is determined to be in failure when the integrated value of the differences is equal to or larger than a predetermined threshold value. According to the invention, failure of the particulate filter can be accurately detected based on the characteristic of the variation rate of the differential pressure when the particulate filter has a trouble.

DESCRIPTION OF THE PREFERRED EMBODIMENTS

Figure 1:
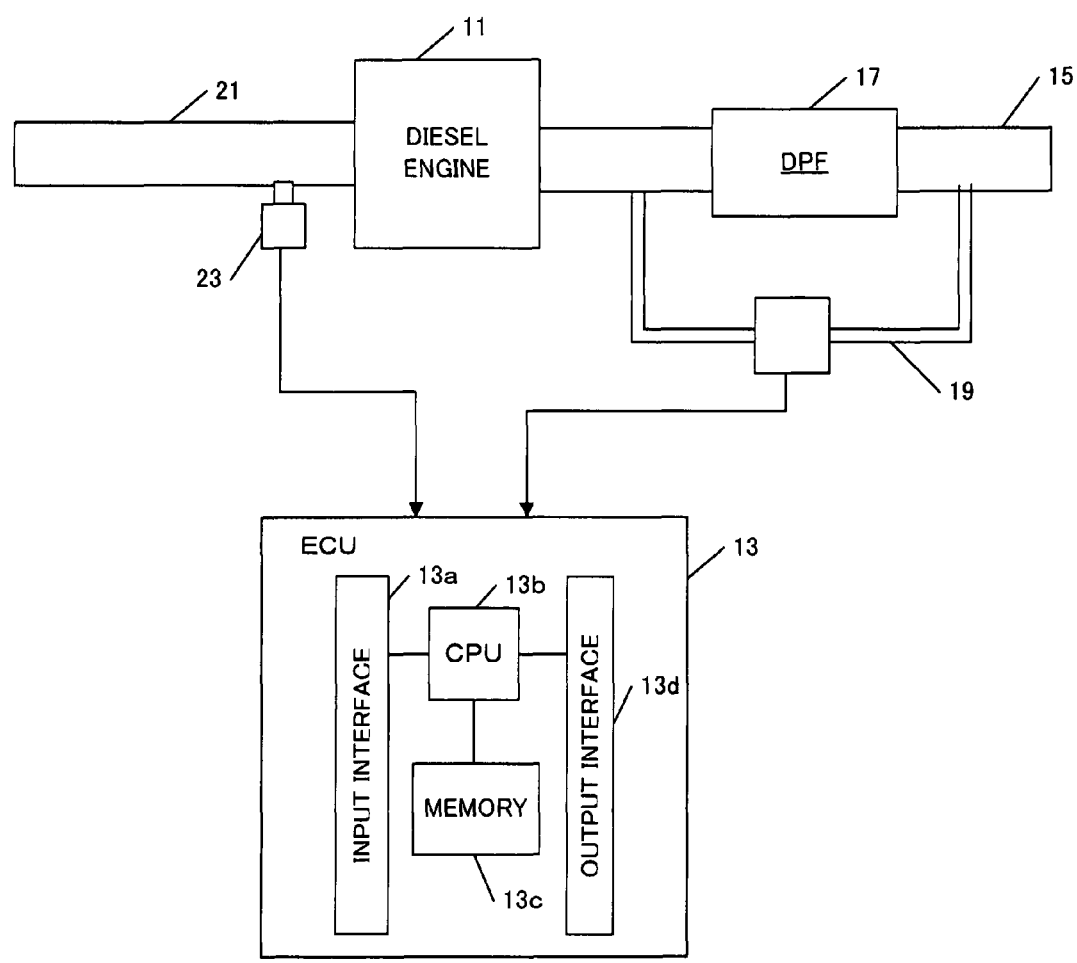
FIG. 1 is a block diagram showing a structure of a diesel engine mounted on a vehicle and its control unit in accordance with one embodiment of the present invention.

Preferred embodiments of an apparatus for detecting a state of a particulate filter in accordance with the present invention will be described below with reference to the accompanying drawings. FIG. 1 is a block diagram showing a structure of a diesel engine mounted on a vehicle and its control unit in accordance with one embodiment of the present invention.

A diesel engine 11 is a direct injection type of engine in which fuel is injected into a combustion chamber of each cylinder and compressed for natural ignition. The diesel engine 11 controls its output by adjusting fuel injection amount and injection timing by injectors (not illustrated in the drawings) attached to each cylinder. Each injector injects fuel at an optimum timing based on a control command an electric control unit (ECU).

The ECU 13 includes an input interface 13a for receiving data from various parts of a vehicle, and a CPU 13b for performing computations for controlling various parts of the vehicle. ECU 13 also includes a memory 13c including a Read-Only Memory (ROM) and a Random Access Memory (RAM). ECU 13 further includes an output interface 13d for sending control signals to various parts of the vehicle. The ROM stores computer programs and data required for controlling various parts of the vehicle. Programs to be used for detecting a state of a particulate filter according to the present invention are stored in the ROM. The ROM may be a re-writable type of ROM such as an EPROM. The RAM provides a working space for CPU 13b. The data transmitted from various parts of the vehicle and the control signals sent out to various parts of the vehicle are temporarily stored in the RAM.

Various signals including sensor outputs transmitted to the ECU 13 are received by the input interface 13a in which the signals are converted from analog to digital. The CPU 13b processes the converted digital signals according to the programs stored in the memory 13c to create control signals to be sent to various parts of the vehicle. The output interface 13d sends the control signals to various elements of the engine for controlling the operation of the engine.

A diesel particulate filter (DPF) is provided in an exhaust pipe 15 of the diesel engine 11. The DPF 17 consists of a heat-resistant porous filter wall formed by ceramics, non-woven metallic fiber cloth or the like. The DPF 17 has a plurality of passages forming exhaust flow passages in a flowing direction of the exhaust gas. The diameter of a pore is about 10 microns, so that the particle matters (PM) contained in the exhaust gas can be trapped when they pass through the porous wall.

One end of the exhaust passages of the DPF 17 is blocked either at upstream side or at downstream side in the flowing direction of the exhaust gas. The passages whose upstream end are blocked and the passages whose downstream end are blocked are arranged alternatively and adjacently to each other. Accordingly, the exhaust gas discharged from an exhaust port of each cylinder flows into the passage whose upstream end is open with the downstream end closed, passes through the porous wall separating the adjacent passages each other into the passage whose downstream end is open, thus exiting the DPF from the downstream end. The DPF 17 needs a regeneration process periodically because the PM trapped in the DPF may cause deterioration of filter performance when the PM over-accumulates in the filter.

The PM trapped in the DPF 17 are removed from the DPF by raising the temperature of the filter high enough to burn the PM. A well-known technique for raising the exhaust gas temperature such as post injection, closing of intake shutter valve, EGR introduction or the like may be used to raise the temperature of the filter.

A differential pressure sensor 19 is connected to both of upstream and downstream sides of the DPF 17 via a pressure introducing pipe. The differential pressure sensor 19 sends a signal indicating a difference of pressure between the upstream and downstream sides of the DPF 17 to the ECU 13. The differential pressure between the upstream and downstream sides of the DPF 17 has a characteristic that it increases in accordance with increase in the amount of the PM accumulated in the filter. The ECU 13 can estimate a PM accumulation amount in the DPF 17 by utilizing the output of the differential pressure sensor 19. Furthermore, the ECU 13 can estimate an amount of ashes remaining in the DPF 17 based on the output of the differential pressure sensor 19 immediately after the regeneration process.

A pressure sensor 23 is provided in an air intake pipe 21 of the diesel engine. In this embodiment, the pressure sensor is disposed in an intake manifold (not illustrated in the accompanying drawings) in the air intake pipe and sends to the ECU 13 an output signal showing intake air pressure in the intake manifold (such pressure will be hereinafter referred to as an "intake manifold pressure"). In addition, other sensors and devices such as a turbo-charger and a common-rail and the like for operating the diesel engine 11 are provided in the engine though those devices are not illustrated in the accompanying drawings.

Now, a technique for detecting a state of the DPF according to a first embodiment of the present invention will be described below.

Figure 2:
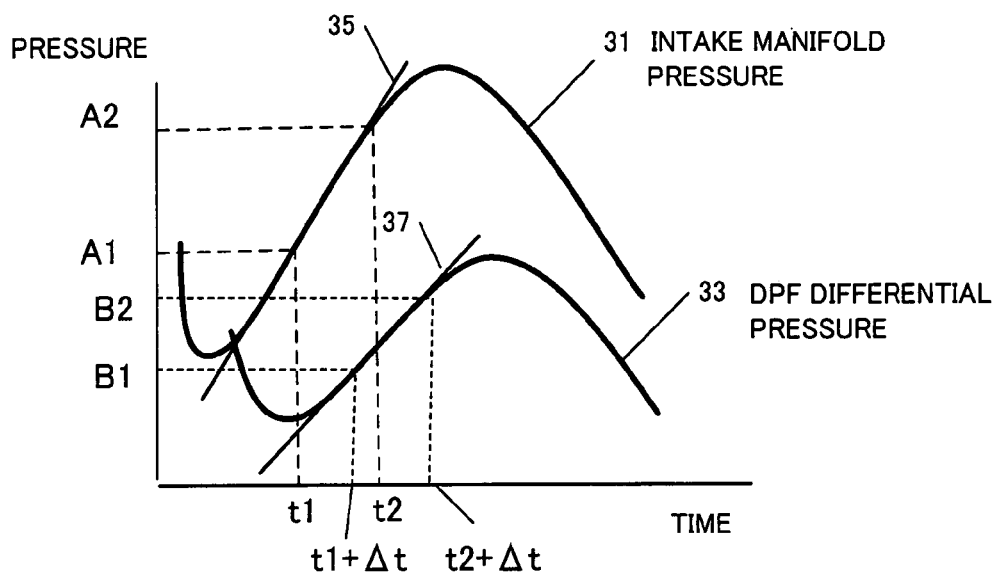
FIG. 2 is a graph showing alteration of intake manifold pressure and DPF (diesel particulate filter) differential pressure when an engine is accelerated.

FIG. 2 is a graph showing alteration of the intake manifold pressure 31 and the DPF differential pressure 33 when the engine 11 is accelerated. The intake manifold pressure 31 is measured by the pressure sensor 23 provided in the air intake pipe 21. The DPF differential pressure 33 is measured by the differential pressure sensor 19 connected to upstream and downstream sides of the DPF 17.

When the engine 11 is accelerated, an amount of the air flowing into the air intake pipe increases as larger amount of air is sucked into the combustion chamber of the engine 11. Accordingly the intake manifold pressure 31 increases. Time required for increasing the intake manifold pressure 31 from A1 (time t1) to A2 (time t2) is expressed by t2−t1. Variation rate α of the intake manifold pressure 31 during that time period can be calculated according to Equation (1).

$$\alpha = (A2-A1)/(t2-t1) \qquad (1)$$

where α can be expressed as a gradient of a straight line 35 connecting a coordinate (t1, A1) with a coordinate (t2, A2) in FIG. 2.

In proportion to an increase of the intake air amount, the flow amount of the exhaust gas within the exhaust pipe 15 increases and the DPF differential pressure 33 increases as well. Besides, alteration of the DPF differential pressure 33 has a time delay Δt relative to alteration of the intake manifold pressure 31 in accordance with a positional relation between the pressure sensor 23 for measuring the intake manifold pressure and the differential pressure sensor 19 for measuring the DPF differential pressure. A variation rate β of the DPF differential pressure 33 corresponding to a variation rate α of the intake manifold pressure 31 can be calculated according to Equation (2).

$$\beta = (B2-B1)/(t2-t1) \qquad (2)$$

where B1 represents a DPF differential pressure at time t1+Δt and B2 represents a DPF differential pressure at time t2+Δt. β is expressed as a gradient of a straight line 37 connecting a coordinate (t1+Δt, B1) with a coordinate (t2+Δt, B2) in FIG. 2.

The variation rate α of the intake manifold pressure and the variation rate β of the DPF differential pressure take different values in accordance with the degree of acceleration of the engine. However, alteration of the behavior responsive to acceleration conditions is the same for the two and there is a certain correlation between the variation rate α of the intake manifold pressure and the variation rate β of the DPF differential pressure.

In this embodiment, the state of the DPF is detected by using the variation rate α of the intake manifold pressure and the variation rate β of the DPF differential pressure during engine acceleration.

Figure 3:
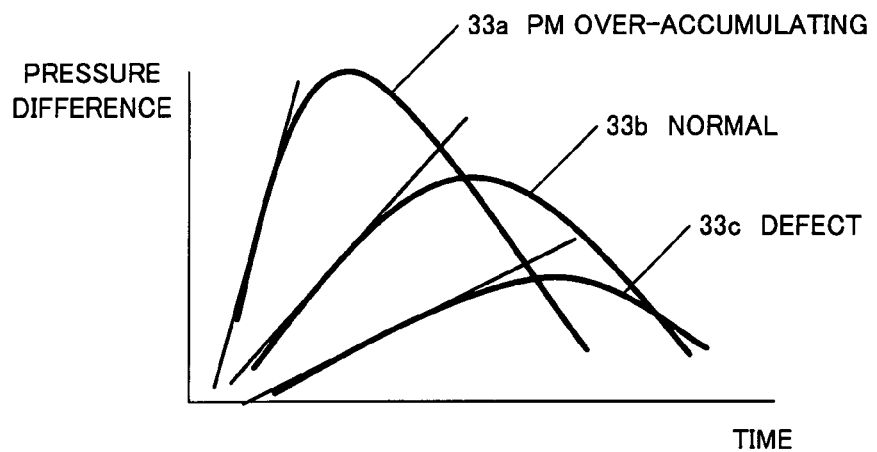
FIG. 3 is a graph showing a behavior and a variation rate $\beta$ of DPF difference pressure in accordance with various DPF states during engine acceleration under the same condition.

FIG. 3 is a graph showing difference in alteration of the DPF differential pressure in accordance with different states of the DPF 17 during acceleration with the same condition. Since the engine acceleration condition is unchanged, the variation rate α of the intake manifold pressure is constant.

A graph 33a shows a DPF differential pressure in a state where the accumulated amount of the PM is large to cause clogging in the DPF (this state will be hereinafter referred to as "over-accumulated state"). Under the over-accumulated state, the DPF differential pressure becomes large because the exhaust gas cannot flow smoothly through the DPF 17 in comparison with the normal time. Accordingly, the variation rate β becomes large.

A graph 33c shows a DPF differential pressure in a state where certain breakage exists in the DPF (such state will be hereinafter referred to as "defect state"). Under the defect state, the DPF differential pressure becomes small because the exhaust gas flows more smoothly through the DPF 17 than in the normal state. Correspondingly, the variation rate β becomes smaller.

Thus, the variation rate β of the DPF differential pressure has a characteristic to have different values depending on the state of the DPF.

Now, a ratio γ=α/β of the variation rate α of the intake manifold pressure to the variation rate β of the DPF differential pressure will be considered below. When the DPF is in the defect state, the value of γ is large because β, which is the denominator of γ, is small. On the other hand, when the DPF is in the over-accumulated state, the value of γ is small because β, the denominator of γ, is large.

Figure 4:
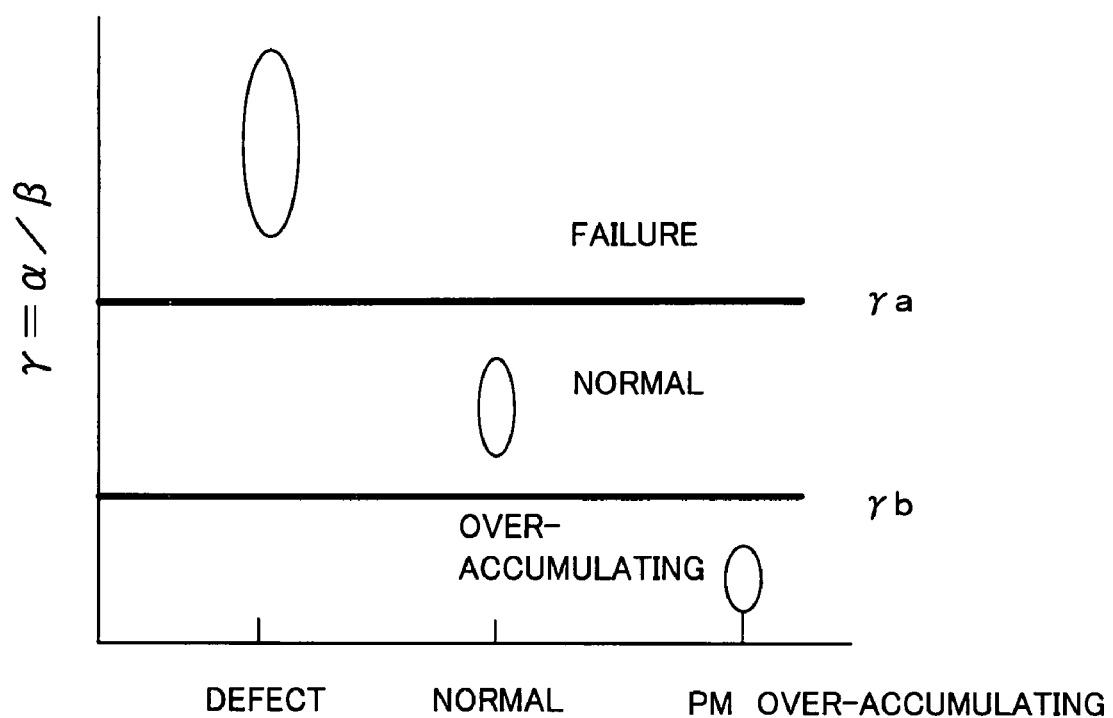
FIG. 4 is a graph showing a first threshold value $\gamma a$ and a second threshold value $\gamma b$ in a first embodiment of the present invention.

As can be seen in FIG. 4, γ lies in respectively different regions in accordance with defect, normal and over-accumulated states of the DPF 17. Therefore, by establishing appropriate threshold values, the state of the DPF 17 can be classified into the defect state, the normal state and the over-accumulated state. For example, referring to FIG. 4, the defect state can be distinguished from the other states by a first threshold value γa. This state indicates that the DPF 17 is in failure. Similarly, the over-accumulated state can be distinguished from the other states by a second threshold value γb. This state indicates that the DPF 17 has accumulated more PM than an allowable amount.

In this embodiment, the state of the DPF 17 is determined based on the ratio γ of the variation α of the intake manifold pressure to the variation β of the DPF differential pressure during engine acceleration.

Figure 5:
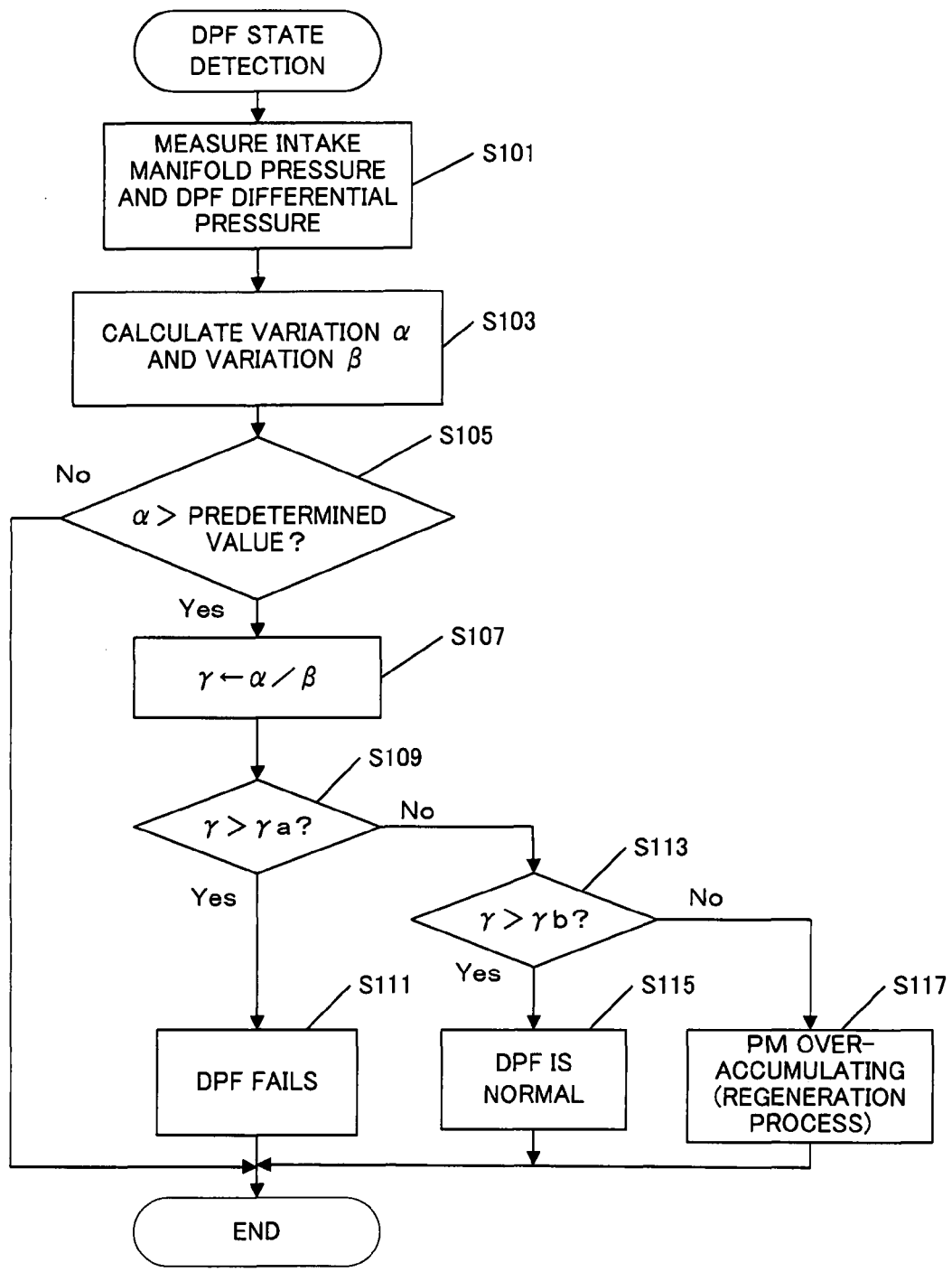
FIG. 5 is a flowchart of a process for detecting a state of the DPF in accordance with a first embodiment of the present invention.

FIG. 5 is a flowchart of a process for detecting the state of the DPF 17 in accordance with the present embodiment.

In Step S101, the intake manifold pressure and the DPF differential pressure are measured. The intake manifold pressure 31 is measured by the pressure sensor 23 provided in the air intake pipe 21. The DPF differential pressure 33 is measured by the differential pressure sensor 19 connected to the upstream and downstream sides of the DPF 17.

In Step S103, the variation rate α of the intake manifold pressure is calculated according to Equation (1) and the variation rate β of the DPF differential pressure is calculated according to Equation (2). In this step, a time lag Δt (to be used in Equation (2)) between the intake manifold pressure and the DPF differential pressure is determined based on the positional relation of the pressure sensor and the differential pressure sensor and the intake air flow amount or the exhaust flow amount.

In Step S105, it is determined whether or not the variation rate α of the intake manifold pressure is equal to or larger than a predetermined value. When the variation rate α is equal to or larger than the predetermined value, it is determined that the engine is in a transitional operation condition and the process goes to Step S107. When the variation rate α is smaller than the predetermined value, the process is exited.

In Step S107, the ratio γ=α/β of the variation rate α of the intake manifold pressure to the variation rate β of the DPF differential pressure is calculated.

In Step S109, it is determined whether or not γ is larger than a predetermined first threshold value γa. When γ is larger than the threshold value γa, the DPF is determined to be in failure (S11). When γ is equal to or smaller than the threshold value γa, the process goes to Step S113.

In Step S113, it is determined whether or not γ is larger than a predetermined second threshold value γb. When γ is larger than the threshold value γb, the DPF is determined to be normal (S115). When γ is equal to or smaller than the threshold value γb, the process goes to Step S117, in which it is determined that the DPF is in an over-accumulated state and a regeneration process is performed.

In the present embodiment, as described above, detection of the DPF state is carried out when the engine is accelerated. Since such transitional time as the engine acceleration time takes place frequently during vehicle operation, detection of the DPF state in accordance with present embodiment can be performed frequently during vehicle operation.

Now, a second embodiment according to the present invention will be described below.

The basic concept of the DPF state detecting technique according to the second embodiment is the same as the first embodiment, but the second embodiment is different from the first embodiment in a method for establishing threshold values to be used for determining the DPF state.

Figure 6:
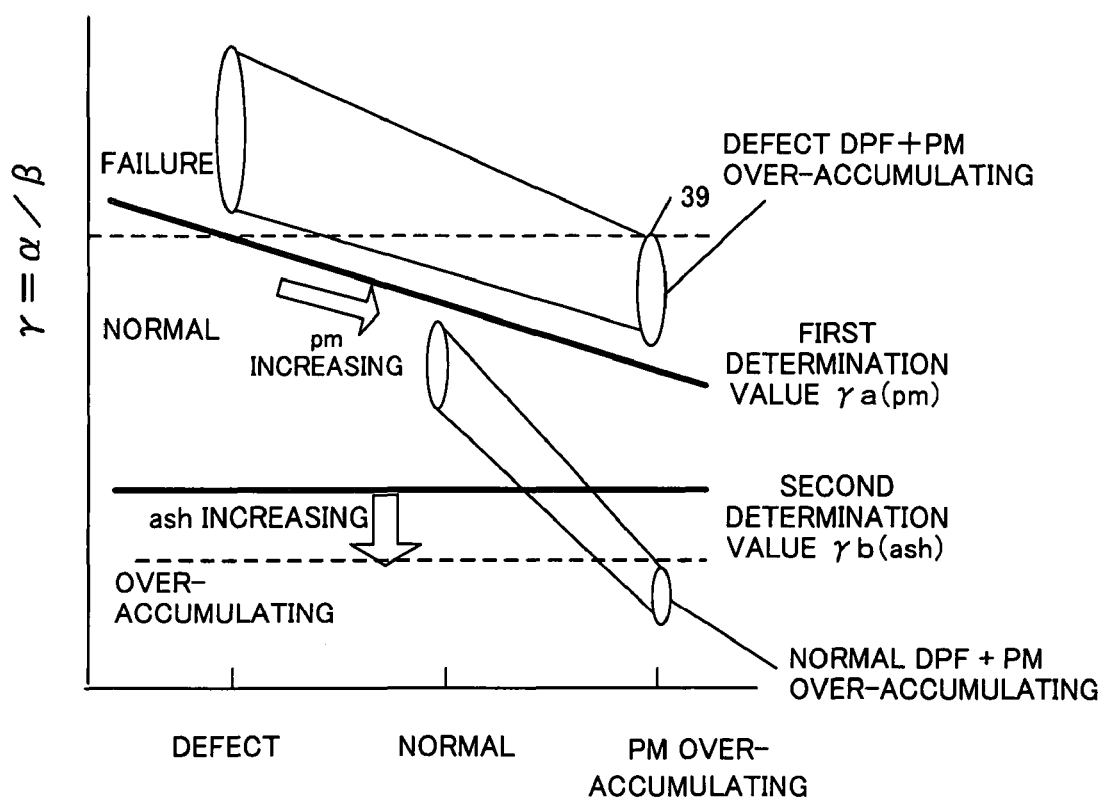
FIG. 6 is a graph showing a first threshold value $\gamma a(pm)$ and a second threshold value $\gamma b(ash)$ in a second embodiment of the present invention.

FIG. 6 shows a first threshold value γa(pm) and a second threshold value γb(ash) used in the second embodiment. As described above with reference to FIG. 4, the state of the DPF 17 can be determined based on a variable value of the ratio γ of the variation α of the intake manifold pressure to the variation β of the DPF differential pressure. However, as shown by a region 39 in FIG. 6, when some failure like a breakage takes place in the over-accumulated state, there can be a consequence that the exhaust gas does not flow through the DPF in the same manner as in the normal state and the value of γ does not become large in comparison with the normal state. In such situation, the failure state of the DPF 17 may not be distinguished as γ does not exceed the first threshold value γa, which is a constant.

Thus, in the second embodiment, the first threshold value to be used for determining failure of the DPF is set as a function γa(pm) that is variable in accordance with the accumulation amount pm of the PM. The first threshold value γa(pm) is set to become smaller in proportion to increase of the PM accumulation amount pm as shown in FIG. 6.

After regeneration process is performed upon the DPF, some unburned matters (ash) of oil elements or the like included in the exhaust gas may remain within the DPF. Such ashes accumulate within the DPF every time the regeneration process is performed. The variation rate β to be used for determining the DPF state in the present embodiment is influenced by the amount of the residue ashes in addition to the PM. In other words, when the amount of the residue ashes increases, the variation rate β of the DPF differential pressure corresponding to the same accumulation amount of the PM takes a larger value, which means that $\gamma=\alpha/\beta$ becomes smaller. If the second threshold value $\gamma b$ is a constant, that the DPF may erroneously determined to be in the over-accumulated state due to the influence of the amount of the residue ashes though the PM has not yet accumulated to such an extent as to need a regeneration process.

Therefore, in the present embodiment, the second threshold value to be used for determining the over-accumulated state of the DPF is set as a function $\gamma b(ash)$ that is variable in accordance with the remaining ash amount ash. The second threshold value $\gamma b(ash)$ becomes smaller in proportion to increase of the remaining ash amount ash as shown in FIG. 6.

Figure 7:
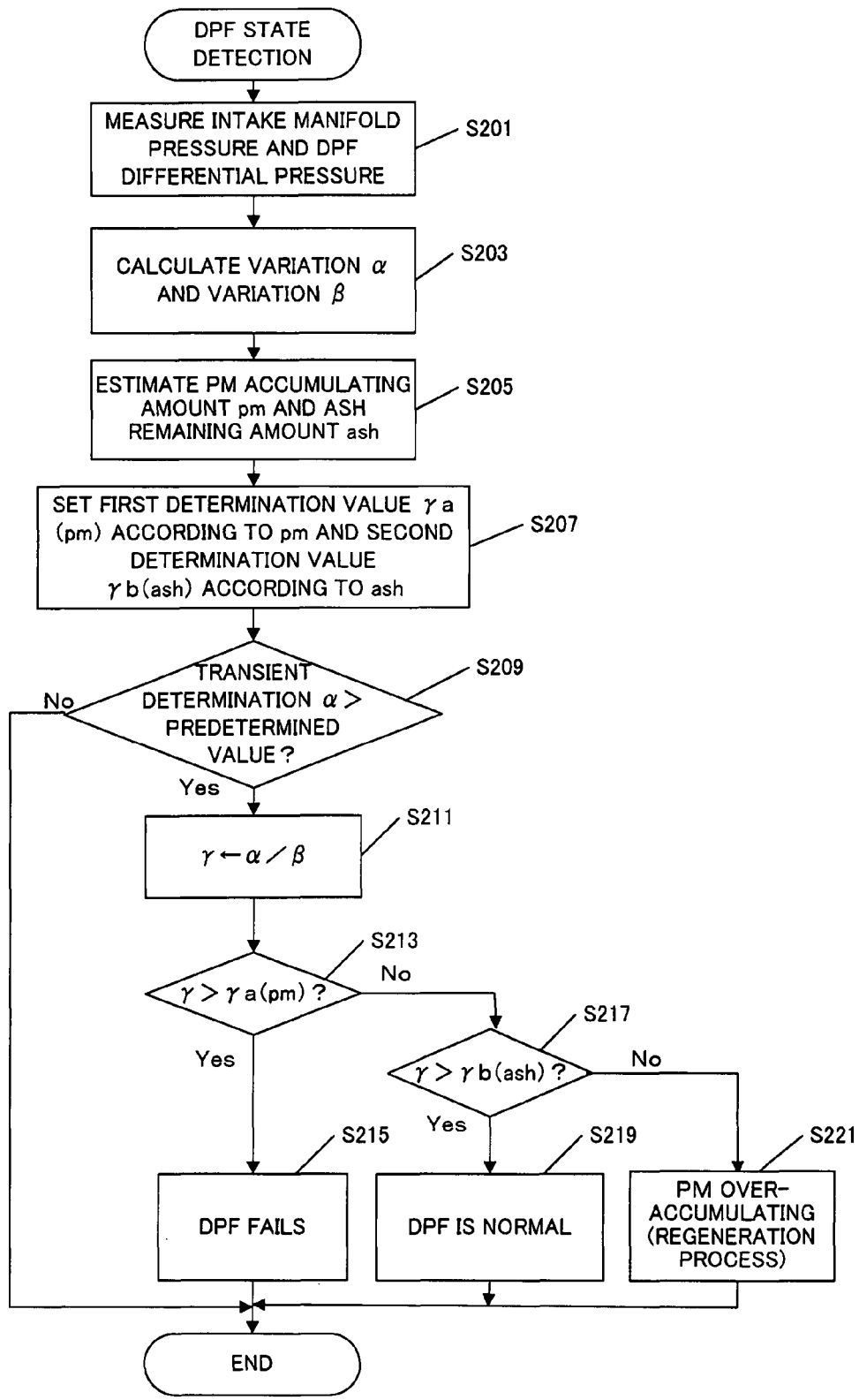
FIG. 7 is a flowchart of a process for detecting a state of the DPF in accordance with a second embodiment of the present invention.

FIG. 7 is a flowchart of a process for detecting a state of the DPF in accordance with the second embodiment.

In Step S201, the intake manifold pressure and the DPF differential pressure are measured. The intake manifold pressure 31 is measured by the pressure sensor 23 provided within the air intake pipe 21 and the DPF differential pressure 33 is measured by the differential pressure sensor 19 connected to the upstream and downstream sides of the DPF 17.

The variation rate $\alpha$ of the intake manifold pressure and the variation rate $\beta$ of the DPF differential pressure are calculated according to Equation (1) and Equation (2) respectively (S203). In this step, a time lag $\Delta t$ (to be used in Equation (2)) between the intake manifold pressure and the DPF differential pressure is determined based on the positional relation of the pressure sensor and the differential pressure sensor as well as the intake air flow amount or the exhaust flow amount.

In Step S205, the PM accumulation amount pm of the DPF and the remaining ash amount ash are estimated. The PM accumulation amount pm is calculated based on the intake manifold pressure, the DPF differential pressure or the like according to known technique as described in, for example, the above-referenced Japanese Patent Publication No. H8-284644. The remaining ash amount ash is calculated based on, for example, the DPF differential pressure immediately after a regeneration process has been carried out. Alternatively, the residue ash amount ash may be calculated based on a difference $\Delta\gamma$ between a ratio $\gamma$ of the variation rate $\alpha$ of the intake manifold pressure with the variation rate $\beta$ of the DPF differential pressure immediately after the regeneration process and an equivalent ratio $\gamma$ regarding a thoroughly new or almost new DPF. The residue ash amount is calculated every time a regeneration process is carried out and stored in the memory 13c.

In Step S207, the first threshold value $\gamma a(pm)$ is set in accordance with the estimated PM accumulation amount pm and the second threshold value $\gamma b(ash)$ is set in accordance with the estimated residue ash amount ash.

In Step S209, it is determined whether or not the variation rate $\alpha$ of the intake manifold pressure is equal to or larger than a predetermined value. When the variation rate $\alpha$ is equal to or larger than the predetermined value, it is determined that the engine is in a transitional operation condition and the process moves to Step S211. When the variation rate $\alpha$ is smaller than the predetermined value, the process is exited.

In Step S211, a ratio $\gamma=\alpha/\beta$ of the variation rate $\alpha$ of the intake manifold pressure to the variation rate $\beta$ of the DPF differential pressure is calculated.

In Step S213, it is determined whether or not $\gamma$ is larger than the first threshold value $\gamma a(pm)$. When $\gamma$ is larger than the threshold value $\gamma a(pm)$, the DPF is determined to be in failure (S215). When $\gamma$ is equal to or smaller than the threshold value $\gamma a(pm)$, the process moves to Step S217.

In Step S217, it is determined whether or not $\gamma$ is larger than the second threshold value $\gamma b(ash)$. When $\gamma$ is larger than the second threshold value $\gamma b(ash)$, the DPF is determined to be normal (S219). When $\gamma$ is equal to or smaller than the second threshold value $\gamma b(ash)$, the DPF is determined to be in the over-accumulated state (S221) and a regeneration process is performed.

In the present embodiment, as described above, since the threshold values are changed in accordance with the PM accumulation amount and the remaining ash amount within the DPF, the DPF state can be detected accurately even in such state in which the PM and/or ashes are over-accumulated in the DPF.

Now, a third embodiment of the present invention will be described below.

Figure 8:
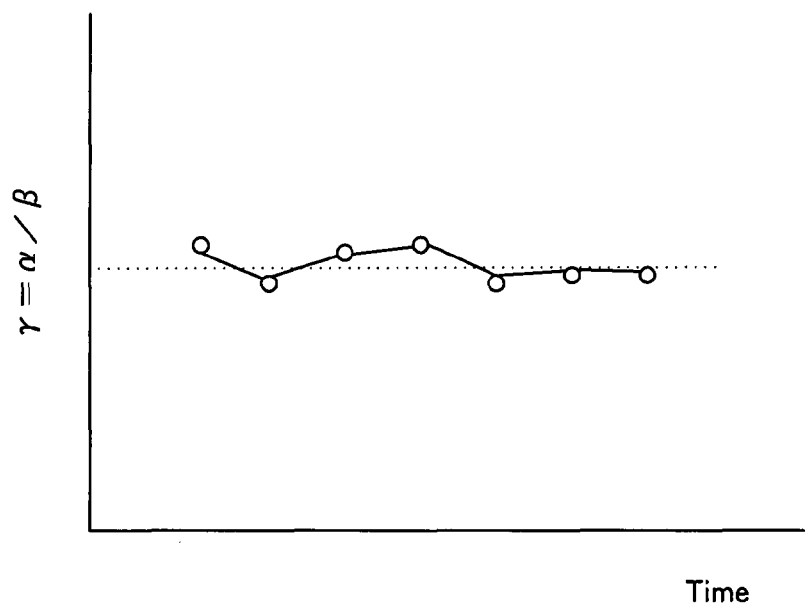
FIG. 8 shows movements of the values of $\gamma$ which are calculated for each cycle of DPF state detecting processes at DPF normal time and at DPF failure time respectively.
Figure 8:
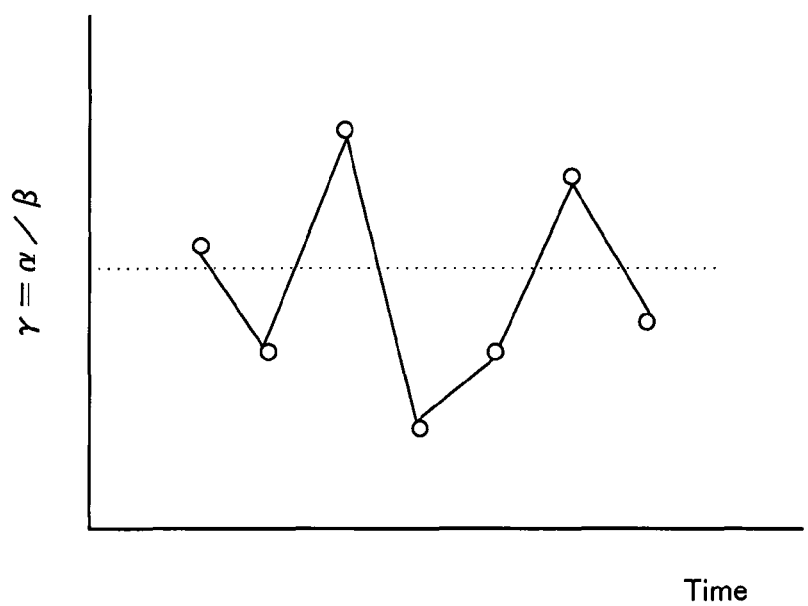

FIG. 8 shows behavior of the values of $\gamma$ which are calculated for each cycle of the DPF state detecting process during the DPF normal period and the DPF failure period respectively. In the DPF normal period, there is no significant change in the values of $\gamma$ over many cycles as shown in (a) of FIG. 8. On the other hand, in the DPF failure period, as shown in (b) of FIG. 8, the variation rate $\beta$ of the DPF differential pressure becomes unstable because the flow of the exhaust gas in the DPF is unstable by the influence of defects. Accordingly, there is a characteristic that unevenness of the values of $\gamma$ which are calculated for different cycles of the process is large in the PDF failure period.

In the present embodiment, difference between the previous value and the current value of $\gamma$ is integrated for a predetermined number of times. When the integrated value exceeds a predetermined threshold value, the DPF state detection is performed. The integrated value represents a degree of unevenness of $\gamma$. In other words, larger integrated value indicates larger unevenness of $\gamma$.

Figure 9:
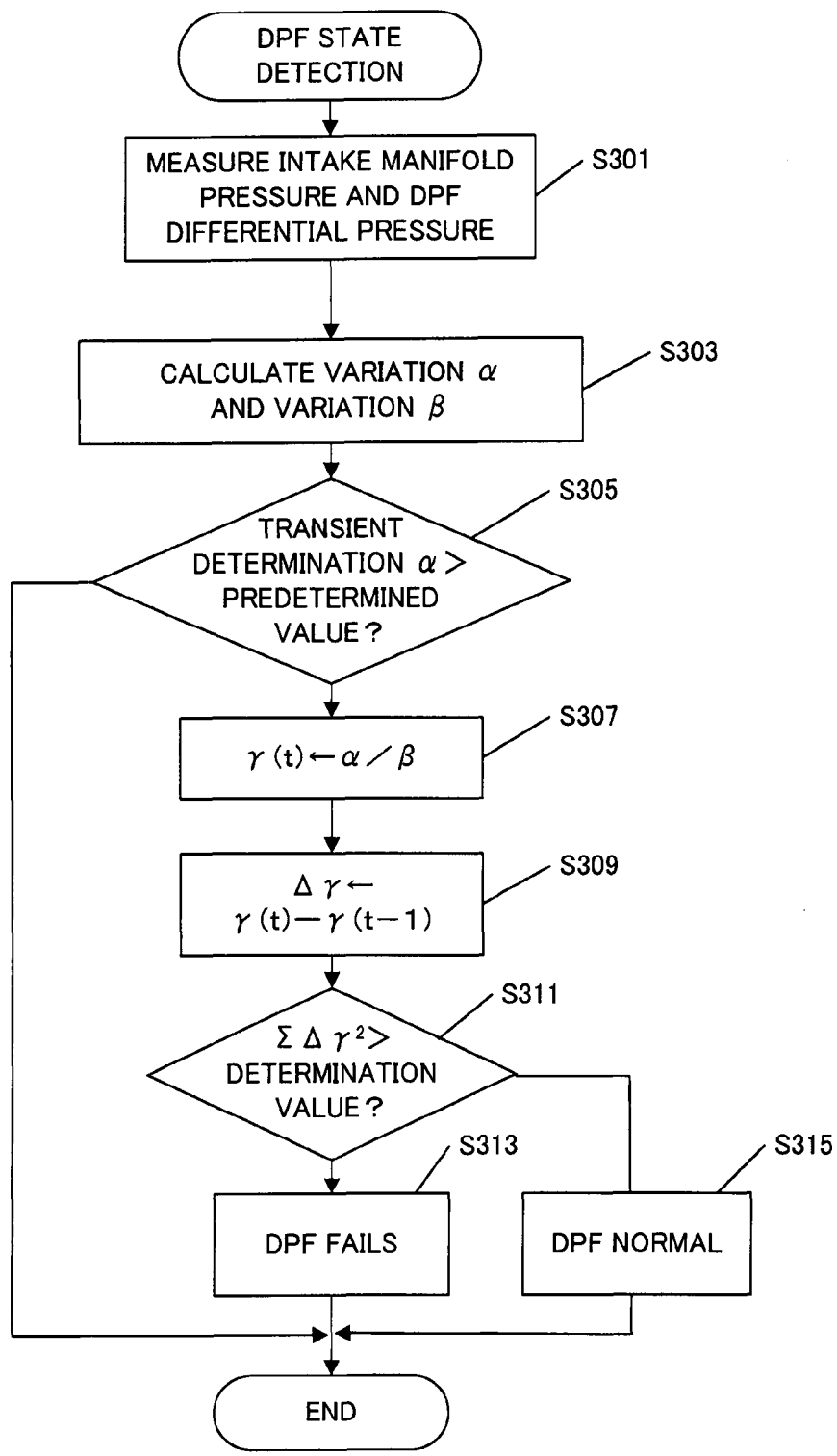
FIG. 9 is a flowchart of a process for detecting a state of the DPF in accordance with a third embodiment of the present invention.

FIG. 9 is a flowchart of a process for detecting a state of the DPF in accordance with the third embodiment.

In Step S301, the intake manifold pressure and the DPF differential pressure are measured. The intake manifold pressure 31 is measured by the pressure sensor 23 provided in the air intake pipe 21 and the DPF differential pressure 33 is measured by the differential pressure sensor 19 connected to the upstream and downstream sides of the DPF 17.

The variation rate $\alpha$ of the intake manifold pressure and the variation rate $\beta$ of the DPF differential pressure are calculated according to Equation (1) and Equation (2), respectively (S303). In this step, a time lag $\Delta t$ (to be used in Equation (2)) between the intake manifold pressure and the DPF differential pressure is determined based on the positional relation between the pressure sensor and the differential pressure sensor and the intake air flow amount or the exhaust flow amount.

In Step S305, it is determined whether or not the variation rate $\alpha$ of the intake manifold pressure is equal to or larger than a predetermined value. When the variation rate $\alpha$ is equal to or larger than the predetermined value, the engine is determined to be in a transitional operation condition and the process goes to Step S307. When the variation rate $\alpha$ is smaller than the predetermined value, the process is existed.

In Step S307, a ratio $\gamma(t)=\alpha/\beta$ between the variation rate $\alpha$ of the intake manifold pressure and the variation rate $\beta$ of the DPF differential pressure is calculated.

In Step S309, a difference $\Delta\gamma$ between the current value $\gamma(t)$ and the previous value $\gamma(t-1)$ regarding $\gamma$ is calculated as in $\Delta\gamma=\gamma(t)-\gamma(t-1)$.

In Step S311, it is determined whether or not a sum of squares of $\Delta\gamma$ for a predetermined number of times, which is expressed as $\Sigma\Delta\gamma^2$, is larger than a predetermined threshold value. When the sum of squares $\Sigma\Delta\gamma^2$ is larger than the threshold value, the DPF is determined to be in failure (S313). When the sum of squares $\Sigma\Delta\gamma^2$ is equal to or smaller than the threshold value, the DPF is determined to be normal (S315).

The present invention has been described above with reference to some specific embodiments. However, the present invention is not limited to such specific embodiments.

Although the intake manifold pressure is used for determining the state of DPF in the above-described embodiments, any parameter may be used as long as it has a correlation with the flow amount of the exhaust gas. For example, the present invention can be implemented even by using an internal pressure of an exhaust pipe that is located on the upstream side of the DPF. Besides, an intake air flow amount or an exhaust flow amount may be directly measured for use in the present invention Further, although the engine acceleration time is used as a transitional time for detecting the state of the DPF 102 in the above-described embodiments, the present invention can be implemented even if a deceleration time is used alternatively.

Besides, although the diesel engine has been described in the above-described embodiments, a gasoline engine can be applicable equivalently to the present invention.

What is claimed is:

1. An apparatus for detecting a state of a particulate filter provided in an exhaust system of an internal-combustion engine, the apparatus comprising:
    means for determining values of a parameter correlated with flow amount of exhaust gas of the engine;
    means for detecting a differential pressure at upstream and downstream sides of the particulate filter; and
    means for comparing the ratio of a variation rate of the parameter correlated with the exhaust flow amount to a variation rate of the differential pressure with a predetermined threshold value during a transitional operation of the engine to determine the state of the particulate filter.

2. The apparatus as claimed in claim 1, wherein the parameter correlated with the exhaust flow amount is an internal pressure of an air intake pipe of the engine.

3. The apparatus as claimed in claim 1, wherein said means for comparing compares said ratio with a first threshold value to determine a failure of the particulate filter.

4. The apparatus as claimed in claim 1, wherein said means for comparing compares said ratio with a second threshold value to determine that particulates have over-accumulated in the particulate filter.

5. The apparatus as claimed in claim 3, wherein the first threshold value is established in accordance with an accumulation amount of the particulates in the particulate filter, and wherein said means for comparing compares said ratio with a second threshold value to determine that particulates have over-accumulated in the particulate filter and the second threshold value is established in accordance with an amount of residue ashes in the particulate filter.

6. The apparatus as claimed in claim 4, wherein the second threshold value is established in accordance with an amount of residue ashes in the particulate filter.

7. The apparatus as claimed in claim 1, wherein said means for comparing includes means for integrating differences between a current value and a previous value of said ratio, and wherein the particulate filter is determined to be in failure when the integrated value of the differences is equal to or larger than a predetermined threshold value.

8. A method for detecting a state of a particulate filter provided in an exhaust system of an internal-combustion engine, comprising:
    determining values of a parameter correlated with flow amount of exhaust gas of the engine;
    detecting a differential pressure at upstream and downstream sides of the particulate filter; and
    comparing the ratio of variation rate of the parameter correlated with the exhaust flow amount to a variation rate of the differential pressure with a predetermined threshold value during a transitional operation of the engine to determine the state of the particulate filter.

9. The method as claimed in claim 8, wherein the parameter correlated with the exhaust flow amount is an internal pressure of an air intake pipe of the engine.

10. The method as claimed in claim 8, wherein the step of comparing compares said ratio with a first threshold value to determine a failure of the particulate filter.

11. The method as claimed in claim 8, wherein the step of comparing compares said ratio with a second threshold value to determine that particulates have over-accumulated in the particulate filter.

12. The method as claimed in claim 10, wherein the first threshold value is established in accordance with an accumulation amount of the particulates in the particulate filter.

13. The method as claimed in claim 11, wherein the second threshold value is established in accordance with an amount of residue ashes in the particulate filter.

14. The method as claimed in claim 8, wherein the step of comparing comprises:
    integrating differences between a current value and a previous value of said ratio; and
    determining the particulate filter to be in failure when the integrated value of the differences is equal to or larger than a predetermined threshold value.

15. A non-transitory computer readable recording media storing a computer program for determining a state of a particulate filter provided in an exhaust system of an internal-combustion engine, said computer program, when executed, performing:
    determining values of a parameter correlated with flow amount of exhaust gas of the engine;
    detecting a differential pressure at upstream and downstream sides of the particulate filter; and
    comparing the ratio of variation rate of the parameter correlated with the exhaust flow amount to a variation rate of the differential pressure with a predetermined threshold value during a transitional operation of the engine to determine the state of the particulate filter.

16. The media as claimed in claim 15, wherein the parameter correlated with the exhaust flow amount is an internal pressure of an air intake pipe of the engine.

17. The media as claimed in claim 15, wherein said comparing compares said ratio with a first threshold value to determine a failure of the particulate filter.

18. The media as claimed in claim 15, wherein said comparing compares said ratio with a second threshold value to determine that particulates have over-accumulated in the particulate filter.

19. The media as claimed in claim 17, wherein the first threshold value is established in accordance with an accumulation amount of the particulates in the particulate filter.

20. The media as claimed in claim 18, wherein the second threshold value is established in accordance with an amount of residue ashes in the particulate filter.

21. The media as claimed in claim 15, wherein said comparing comprises:
    integrating differences between a current value and a previous value of said ratio; and
    determining the particulate filter to be in failure when the integrated value of the differences is equal to or larger than a predetermined threshold value.

* * * * *